United States Patent
Singh et al.

(10) Patent No.: US 9,636,955 B2
(45) Date of Patent: May 2, 2017

(54) TIRE TEMPERATURE PREDICTIVE SYSTEM AND METHOD

(71) Applicant: The Goodyear Tire & Rubber Company, Akron, OH (US)

(72) Inventors: Kanwar Bharat Singh, Stow, OH (US); Srikanth Veppathur Sivaramakrishnan, Stow, OH (US); Anthony William Parsons, Domeldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 409 days.

(21) Appl. No.: 14/301,393

(22) Filed: Jun. 11, 2014

(65) Prior Publication Data
US 2015/0360525 A1    Dec. 17, 2015

(51) Int. Cl.
| | |
|---|---|
| *G01K 13/08* | (2006.01) |
| *B60C 23/20* | (2006.01) |
| *B60W 40/12* | (2012.01) |

(52) U.S. Cl.
CPC ............ *B60C 23/20* (2013.01); *B60W 40/12* (2013.01); *G01K 13/08* (2013.01)

(58) Field of Classification Search
CPC .. G01K 1/12; G01K 1/16; G01K 1/20; G01K 1/26; G01K 17/00; G01K 13/08; B60C 23/60
USPC ... 374/141, 142, 143, 153, 137, 29, 166, 44, 374/154
See application file for complete search history.

(56) References Cited

U.S. PATENT DOCUMENTS

| | | | | | |
|---|---|---|---|---|---|
| 3,805,864 | A | * | 4/1974 | Tsuruta ................... | B60C 23/18 152/153 |
| 3,934,452 | A | * | 1/1976 | Prevorsek ............. | G01M 17/02 374/47 |
| 4,130,154 | A | * | 12/1978 | Hampshire ............. | B60C 17/04 152/158 |
| 4,362,200 | A | * | 12/1982 | Standley ............... | B60C 9/1821 152/153 |

(Continued)

FOREIGN PATENT DOCUMENTS

| | | | |
|---|---|---|---|
| DE | 19745734 | 4/1999 | ............. B60C 11/24 |
| DE | 19838638 | 3/2000 | ............... G01L 5/18 |

(Continued)

OTHER PUBLICATIONS

European Search report received by Applicant Nov. 23, 2015.

*Primary Examiner* — Gail Kaplan Verbitsky
(74) *Attorney, Agent, or Firm* — Edward T. Kennedy (57) ABSTRACT

A tire-based system and method for estimating a radially outward tire surface temperature of an identified tire supporting an identified vehicle includes a temperature sensor to measure a tire inner liner temperature. An algorithmic prediction model is empirically trained to correlate inner liner tire temperature to tire radially outward surface temperature for the tire/vehicle combination. The empirically trained algorithmic prediction model receives a steady state temperature-based model inputs including the tire inner liner temperature and an ambient temperature measurement and transient behavior vehicle-based inputs. Based upon the steady state inputs and the transient behavior inputs, a radially outward tire surface temperature estimation is made.

10 Claims, 8 Drawing Sheets

(56) References Cited

U.S. PATENT DOCUMENTS

| | | | | |
|---|---|---|---|---|
| 5,240,669 A * | 8/1993 | Kobayashi | B29D 30/0662 | 264/315 |
| 6,144,910 A * | 11/2000 | Scarlett | A01B 63/023 | 172/4.5 |
| 6,301,534 B1 * | 10/2001 | McDermott, Jr. | B62D 5/001 | 701/41 |
| 6,523,586 B1 | 2/2003 | Eromaki et al. | | 152/154.2 |
| 6,624,748 B1 * | 9/2003 | Phelan | B60C 23/0493 | 152/152.1 |
| 6,630,885 B2 * | 10/2003 | Hardman | B60C 23/0433 | 156/123 |
| 6,854,324 B2 * | 2/2005 | Landes | G01K 1/024 | 340/442 |
| 6,885,296 B2 * | 4/2005 | Hardman | B60C 23/0433 | 340/10.1 |
| 7,314,257 B2 * | 1/2008 | Svendenius | B60T 13/74 | 303/167 |
| 7,411,487 B2 * | 8/2008 | Takao | B60C 23/007 | 116/34 R |
| 7,557,694 B1 | 7/2009 | Graham | | 340/438 |
| 8,290,756 B2 | 10/2012 | Fevrier et al. | | 703/2 |
| 8,560,289 B2 * | 10/2013 | Fevrier | G01M 17/02 | 152/209.6 |
| 8,606,535 B2 * | 12/2013 | Hafele | B60C 23/0408 | 340/442 |
| 8,878,421 B2 * | 11/2014 | Kuisma | H02N 2/18 | 310/319 |
| 9,376,118 B2 * | 6/2016 | Benedict | B60W 40/12 | |
| 9,434,409 B2 * | 9/2016 | Singh | B62D 6/001 | |
| 9,440,659 B2 * | 9/2016 | Kelly | B60W 50/082 | |
| 9,442,045 B2 * | 9/2016 | Singh | G01M 17/02 | |
| 2002/0126005 A1 * | 9/2002 | Hardman | B60C 23/0433 | 340/442 |
| 2004/0017291 A1 * | 1/2004 | Hardman | B60C 23/0433 | 340/505 |
| 2004/0118196 A1 * | 6/2004 | Landes | G01K 1/024 | 73/146 |
| 2004/0140030 A1 * | 7/2004 | Hahn | B60C 1/00 | 152/152.1 |
| 2005/0088292 A1 * | 4/2005 | O'Brien | B60C 23/20 | 340/443 |
| 2005/0242935 A1 | 11/2005 | Kafawy | | 340/438 |
| 2006/0061011 A1 * | 3/2006 | Kikuchi | B60C 9/00 | 264/289.3 |
| 2009/0114322 A1 | 5/2009 | O'Brien | | 152/154.2 |
| 2010/0010795 A1 * | 1/2010 | Fevrier | G06F 17/5009 | 703/8 |
| 2010/0187212 A1 * | 7/2010 | Peruzzo | H05B 3/342 | 219/202 |
| 2010/0318335 A1 * | 12/2010 | Martin | G06F 17/5009 | 703/8 |
| 2012/0145299 A1 * | 6/2012 | Hino | B60C 5/14 | 152/516 |
| 2013/0036791 A1 * | 2/2013 | Shibata | G01N 3/56 | 73/8 |
| 2013/0342341 A1 * | 12/2013 | Simmerman | B60C 23/0498 | 340/449 |
| 2014/0067599 A1 * | 3/2014 | Gokyu | B60C 11/246 | 705/26.7 |
| 2014/0217808 A1 * | 8/2014 | Chang | B60C 7/10 | 301/63.101 |
| 2014/0246136 A1 * | 9/2014 | Iizuka | B60C 5/14 | 152/510 |
| 2014/0319901 A1 * | 10/2014 | Schmidt | B60C 23/19 | 301/6.91 |
| 2015/0000814 A1 * | 1/2015 | Mishima | B60C 15/024 | 152/523 |
| 2015/0128636 A1 * | 5/2015 | McAlister | B01J 19/20 | 62/440 |
| 2015/0174969 A1 * | 6/2015 | Forciniti | B60C 1/0025 | 152/153 |
| 2015/0285712 A1 * | 10/2015 | Singh | G01M 17/02 | 73/8 |
| 2015/0328932 A1 * | 11/2015 | Steenwyk | B60C 11/01 | 165/41 |
| 2016/0236521 A1 * | 8/2016 | Yukawa | B60C 17/0009 | |

FOREIGN PATENT DOCUMENTS

| | | |
|---|---|---|
| JP | 2005186749 A | 7/2005 |
| KR | 20150069047 A | 6/2015 |

* cited by examiner

TIRE TEMPERATURE PREDICTIVE SYSTEM AND METHOD

FIELD OF THE INVENTION

The subject invention relates generally to model-based systems for determining useful tire parameters and, more specifically, to a model-based predictive system and method for predicting a tire radially outward surface temperature.

BACKGROUND OF THE INVENTION

Real-time measurement or prediction of tire-based parameters such as tire outward surface temperature are important adaptive factors in ascertaining tire cornering stiffness and peak grip level. Tire cornering stiffness and peak grip level, in turn, are important for use in certain vehicle stability control systems such as active front/rear steering input and yaw control. Attainment of a high fidelity tire model with which to predict tire temperature with requisite accuracy has, however, has proven problematic.

Accordingly, a reliable, robust, high fidelity system and method for predicting tire radially outward surface temperature is desired for use in vehicle control systems.

SUMMARY OF THE INVENTION

According to an aspect of the invention a tire based system and method for estimating a radially outward tire surface temperature of an identified tire supporting an identified vehicle is provided. The system includes one or more temperature sensors mounted to the tire operative to measure a tire inner liner temperature. An algorithmic prediction model is empirically trained to correlate inner liner tire temperature to tire radially outward surface temperature for the combination represented by the identified tire and the identified vehicle. The empirically trained algorithmic prediction model operatively receives a plurality of steady-state temperature-based model inputs including the tire inner liner temperature and a plurality of transient behavior vehicle-based inputs and generates. based upon the steady-state inputs and the transient behavior inputs, a radially outward tire surface temperature estimation.

In another aspect, the algorithmic model is trained to correlate inner liner tire temperature to tire radially outward surface temperature for the combination represented by the identified tire and the identified vehicle and further by a specifically identified tire location on the vehicle.

In yet another aspect, the system employs vehicle-based sensors providing a plurality of vehicle-based transient behavior measurements. Frictional energy is calculated to render the transient behavior vehicle-based inputs to the algorithmic prediction model from the vehicle-based transient behavior measurements. The vehicle-based transient behavior measurements include vehicle acceleration, slip angle, and yaw rate measured values.

The system pursuant to an additional aspect uses an ambient temperature measurement in the algorithmic prediction model. The model expression thus includes components including frictional energy loss from travel of the tire over a surface, thermal surface-conduction loss from the tire to the surface; air-convection thermal loss from the tire to the air surrounding the tire; and internal-conduction thermal loss within the tire.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" or "controller area network" is a vehicle bus standard designed to allow microcontrollers and devices to communicate with each other within a vehicle without a host computer. CAN bus is a message-based protocol, designed specifically for automotive applications.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance—when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Recursive least squares (RLS)" means an adaptive filter algorithm which recursively finds the filter coefficients that minimize a weighted linear least squares cost function relating to the input signals.

"Rib" means a circumferentially extending strip of rubber on the tread which is defined by at least one circumferential groove and either a second such groove or a lateral edge, the strip being laterally undivided by full-depth grooves.

"SMC Estimator" is a particle filter model that estimates the values of the hidden states x given the values of the observation process y.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

The subject invention recognizes that tire temperature can change tire characteristics in a variety of ways. Specifically, temperature most heavily influences the forces produced by the tire. Tire temperature and, more specifically tire surface temperature, affects the tire's stiffness, and therefore force, in at least two different ways. As the temperature changes, the modulus of elasticity will change, thus changing the stiffness of the tire. When tires run hot for extended periods, the pressure may also increase which again changes the tire stiffness. The temperature will also influence the tire's force capability due to change in the coefficient of friction of the tire with changing temperature. Accurate information on tire surface temperature is accordingly useful but difficult to obtain. The tire model of the subject invention provides a semi-empirical tire surface temperature prediction model effective in producing a real time estimation of tire surface temperature. The tire model surface temperature prediction may thus be used to adapt grip level and braking stiffness. The algorithm used within the tire model can be used to augment tire-attached tire pressure monitoring systems (TPMS) for estimation of other parameters such as load, slip state, camber angle and vehicle speed.

The presented system and method below utilizes inner liner temperature information from tire-based sensors to calculate the surface temperature of the tire through a semi-empirical model by using the inner liner temperature which may be obtained from a tire-attached TPMS module attached to the inner liner. The model thus uses the inner liner temperature as a steady state value from which a real-time tire surface temperature may be derived.

Figure 1:
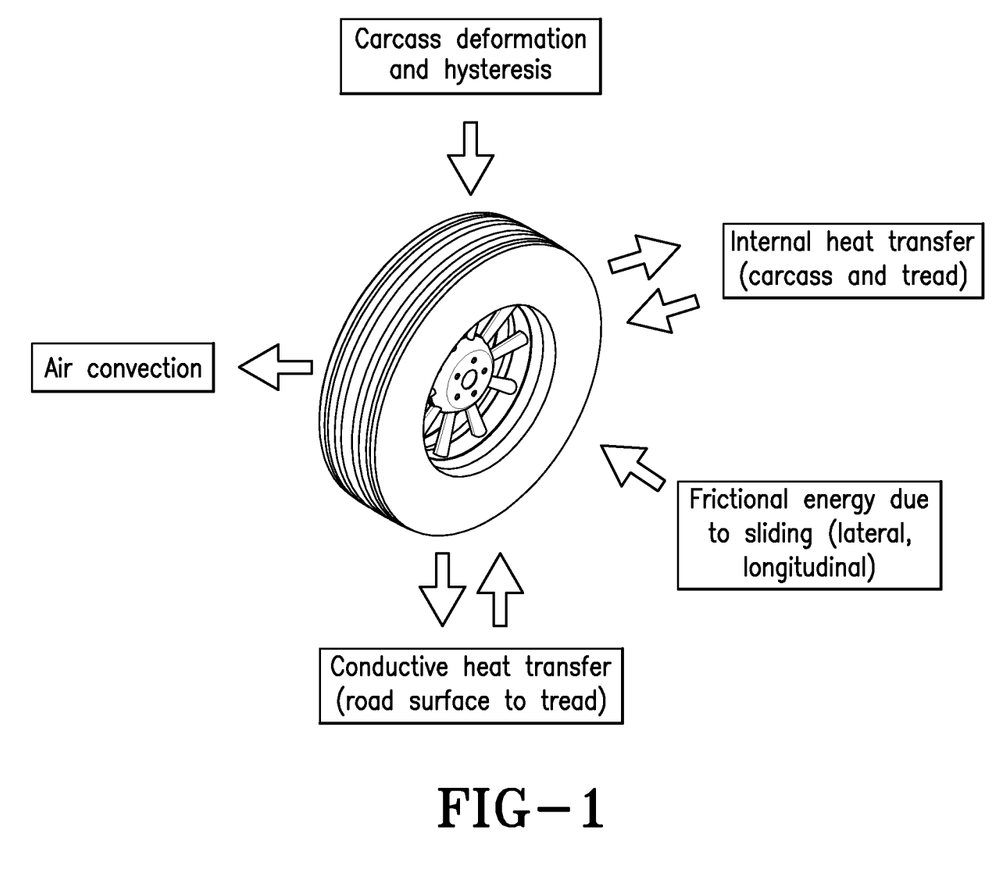
FIG. 1 is a diagram of heat transfer mechanism in a tire system.

FIG. 1 shows a heat transfer diagram for a vehicle tire. Carcass deformation and hysteresis, frictional energy due to sliding (lateral, longitudinal), internal heat transfer (carcass and tread), and conductive heat transfer (road surface to tread) transfer heat to the tire outer surface. Air convection, conductive heat transfer (tread to road surface), and internal transfer (from tread surface to carcass and tread) transfer heat away from the tread outer surface. Accordingly, the dynamic heat transfer mechanism depicted in FIG. 1 makes the temperature of the tread outer surface a dynamic variable during operation of the tire; a variable that affects tire stiffness and gripping. The heat transfer mechanism is assumed to be the first-order differential equation following:

$$C_p \frac{dT_s}{dt} = h_x E_x + h_y E_y + h_{tr} A_c (T_s - T_a) + s_{vx} V_x^{0.8} (T_s - T_a) - h_c (T_s - T_l)$$

Where
$T_s$—Surface temperature
$T_l$—Inner liner temperature
$T_a$—Ambient or track temperature
$A_c$—Contact area
$E_x$—Longitudinal Frictional energy due to sliding
$E_y$—Lateral Frictional energy due to sliding
$h_x$, $h_y$—frictional energy heat transfer coefficients
$h_c$—internal conduction heat transfer coefficient
$s_{vx}$—air convection heat transfer coefficient
$C_p$—Scaling factor
$h_{cr}$—surface conduction heat transfer coefficient As noted above, the heat transfer model incorporates frictional energy loss, thermal loss from the tire to the road surface, air-convection from the tire to air surrounding the tire, and internal conduction thermal loss through the tires. The expressions for each of these thermal energy loss components is identified above.

Figure 2:
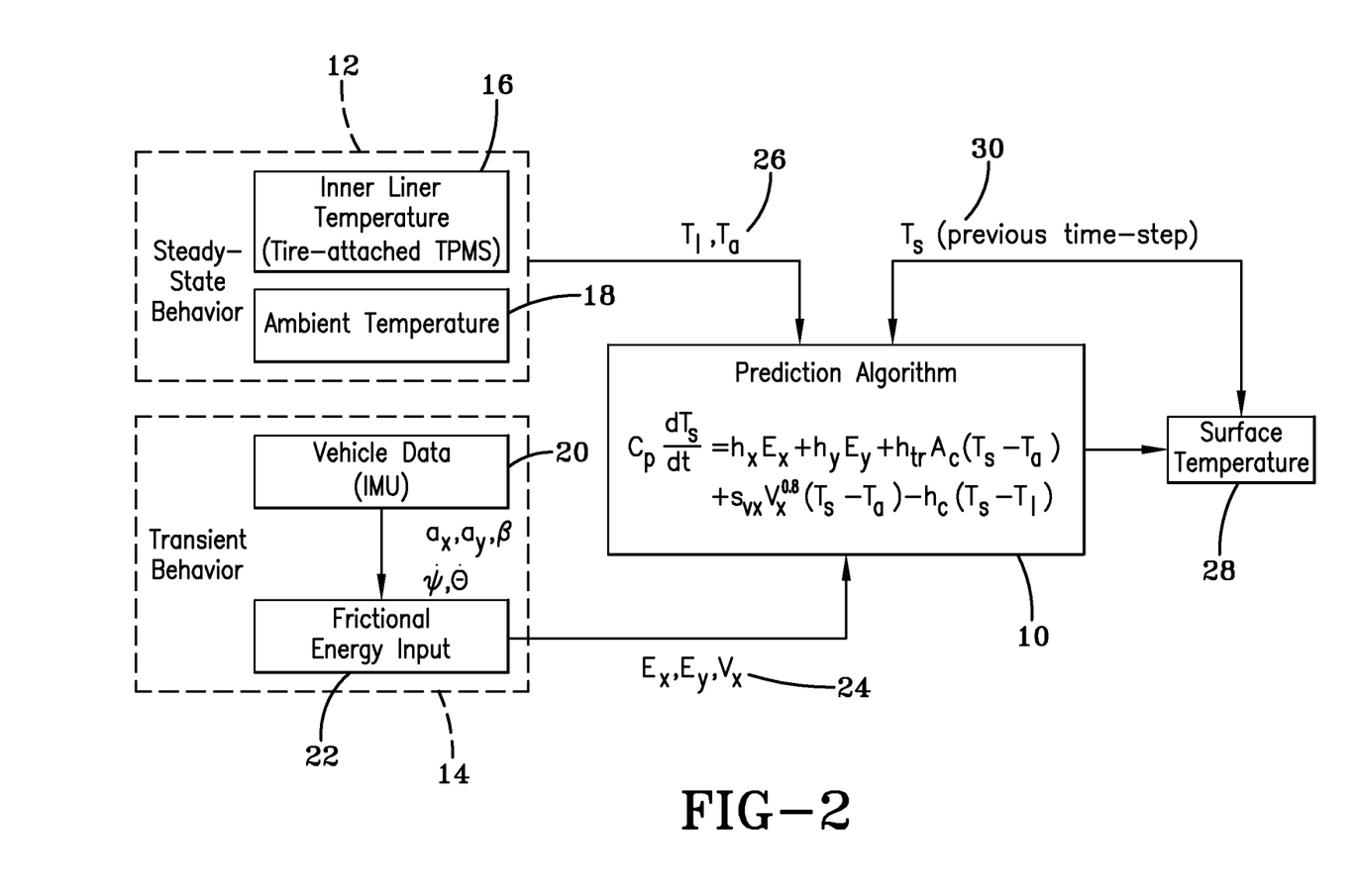
FIG. 2 is a flow diagram of the subject model in the system and method in predicting a tire surface temperature.
Figure 3:
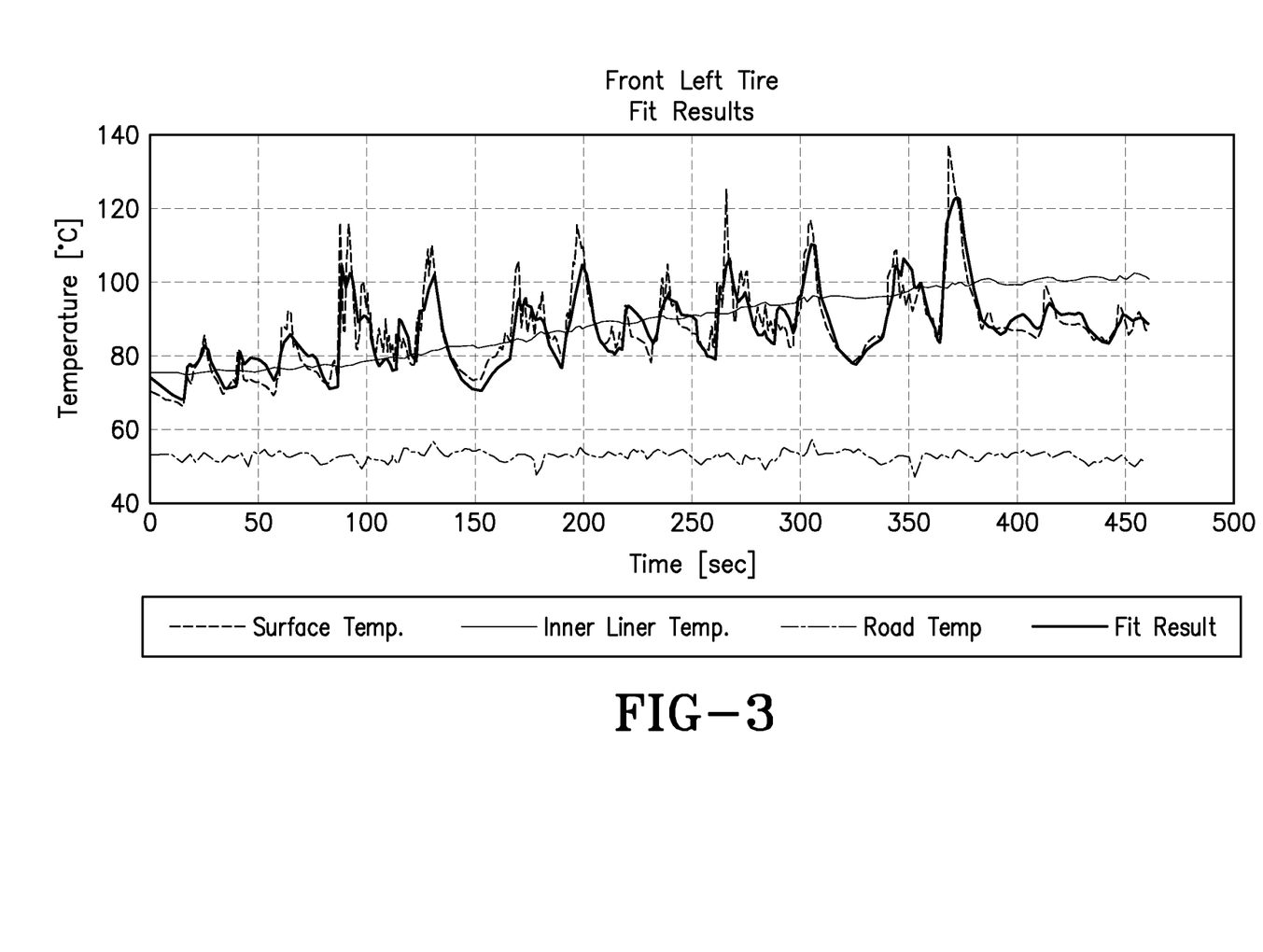
FIG. 3 is a model validation graph showing model fit for a front left tire.
Figure 4:
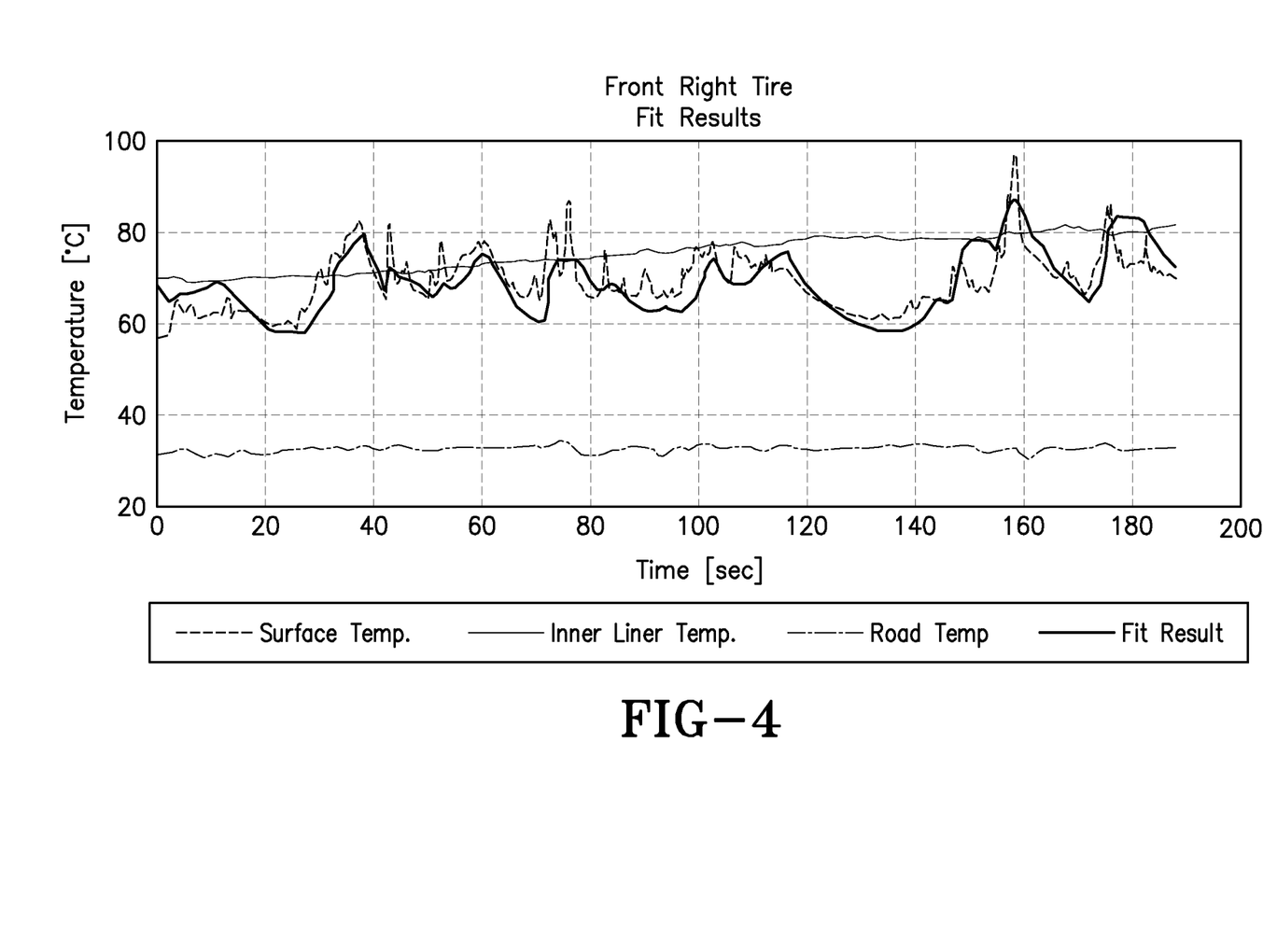
FIG. 4 is a model validation graph for a front right tire.
Figure 5:
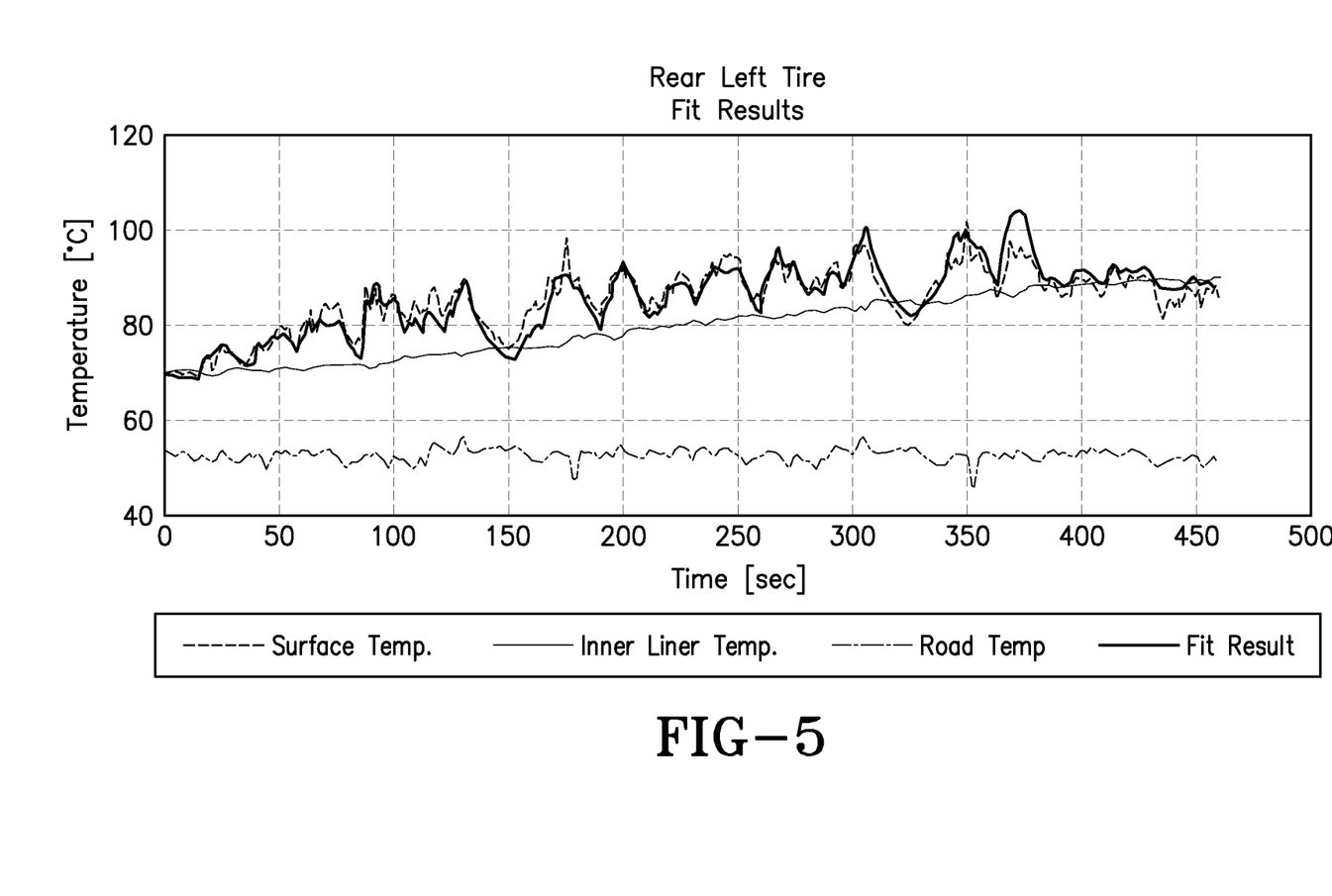
FIG. 5 is a graph of rear left tire fit results.
Figure 6:
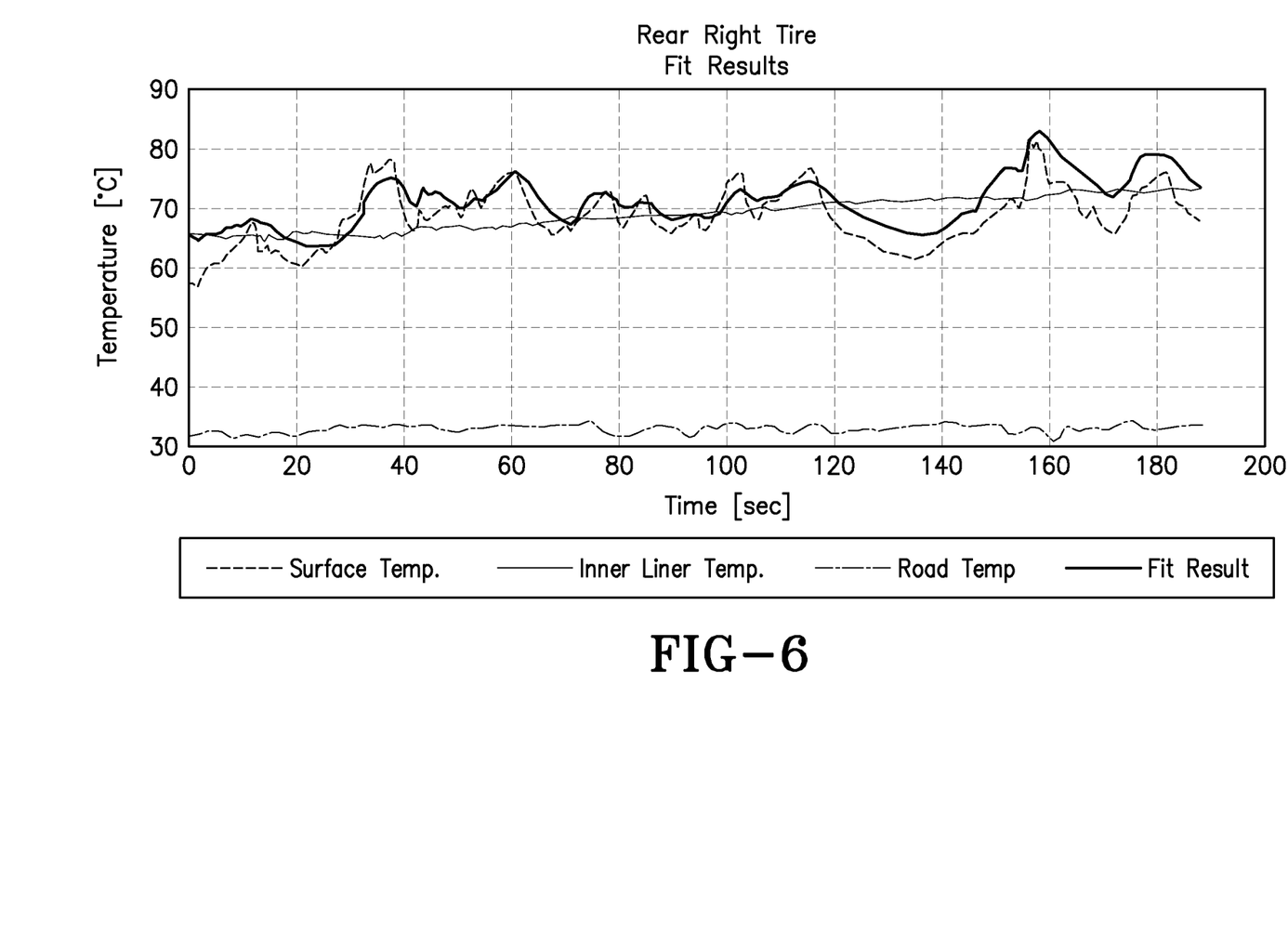
FIG. 6 is a graph showing rear tight tire Fit Results.

As seen in FIG. 2, the prediction algorithm 10 incorporates the steady state behavior 12 and transient behavior 14 inputs. Steady state inputs Tl, Ta 26 are derived from tire inner liner and ambient air temperature measurement sensors. Measurement of the tire inner liner may be achieved through the use of a liner mounted TPMS module 16 of a type commercially available. The ambient temperature 18 may be obtained through a vehicle mounted sensor of a type commercially available and in use.

The transient behavior inputs 24 of Ex and Ey are derived from frictional energy input 22 based upon vehicle data (IMU) 20 as follows. The frictional energy is calculated based on the sliding forces and velocities at the contact patch as:

$$E_x = F_{sx} V_{sx}$$

$$E_y = F_{sy} V_{sy}$$

Where
$F_{sx}$—Longitudinal sliding force
$F_{sy}$—Lateral sliding force
$V_{sx}$—Longitudinal slip velocity
$V_{sy}$—Lateral slip velocity The sliding velocities in the lateral and longitudinal directions are calculated for each tire as:

$$V_{sx} = V_x \kappa$$

$$V_{sy} = V_x \tan \alpha$$

Where
$V_x$—longitudinal velocity of the vehicle
$\kappa$—longitudinal slip ratio of the tire
$\alpha$—lateral slip angle of the tire The slip angles are approximately calculated for each axle based on the lateral velocity and yaw rate of the vehicle:

$$\alpha_f = \tan^{-1}\left(\frac{V_y + ar}{V_x}\right) - \frac{\delta_f}{GR}$$

$$\alpha_r = \tan^{-1}\left(\frac{V_y - br}{V_x}\right)$$

Where
$\alpha_f$—slip angle of the front axle
$\alpha_r$—slip angle of the rear axle
r—yaw rate
$\delta_f$—hand wheel angle
GR—steering gear ratio The lateral velocity of the vehicle is calculated from the sideslip angle as:

$$V_y = V_x \tan \beta$$

Where
$\beta$—sideslip angle of the vehicle

The sideslip angle can be either measured directly or estimated indirectly through standard EKF observers used in the vehicle. The sliding forces contribute to heat generation in the tire and are calculated from the total longitudinal and lateral forces in the tire.

$$F_{sx} = F_x \psi^2 (3 - 2\psi)$$

$$F_{sy} = F_y \psi^2 (3 - 2\psi)$$

Where
$\psi$—adhesion factor
$F_x$—total longitudinal force acting on the tire
$F_y$—total lateral force acting on the tire The total longitudinal and lateral forces on the tire are calculated by scaling the load acting on the tire with vehicle acceleration in the lateral and longitudinal directions.

$$F_x = F_z \frac{a_x}{g}$$

$$F_y = F_z \frac{a_y}{g}$$

Where
$F_z$—dynamic vertical load on the tire
$a_x$—longitudinal acceleration of the vehicle
$a_y$—lateral acceleration of the vehicle The dynamic vertical load on the tire is calculated by accounting for the lateral and longitudinal load transfer due to acceleration. The longitudinal load transfer is calculated as:

$$\Delta F_{z,lon} = \frac{m_s h_{cg} a_x}{2(a+b)}$$

Where
$m_s$—vehicle sprung mass
$h_{cg}$—distance from ground to vehicle center of gravity (CG)

The lateral load transfer in the front and rear axles are calculated as:

$$\Delta F_{zf,lat} = \frac{m_s h_s a_y}{t_f}\left(\frac{K_{\phi f}}{K_{\phi f} + K_{\phi r} - m_s g h_s} + \frac{b}{a+b}\right)$$

$$\Delta F_{zr,lat} = \frac{m_s h_s a_y}{t_r}\left(\frac{K_{\phi f}}{K_{\phi f} + K_{\phi r} - m_s g h_s} + \frac{b}{a+b}\right)$$

Where
$K_{\phi f}$, $K_{\phi r}$—roll stiffness of the front and rear axles
$h_s$—roll center height
$t_f$, $t_r$—front and rear track width The vertical loads are hence calculated as:

$$F_{z,fl,fr} = m_s g \frac{b}{2(a+b)} \pm \Delta F_{z,lon} \pm \Delta F_{zf,lat}$$

$$F_{z,rl,rr} = m_s g \frac{b}{2(a+b)} \pm \Delta F_{z,lon} \pm \Delta F_{zr,lat}$$

Where
$F_{z,fl,fr}$—vertical load on the front left and right tires
$F_{z,rl,rr}$—vertical load on the rear left and right tires The adhesion factor, based on the brush model, is an indicator of the level of sliding in the tire and is calculated from the theoretical slip values as:

$$\psi = \sqrt{\left(\frac{\sigma_x}{\sigma_{x0}}\right)^2 + \left(\frac{\sigma_y}{\sigma_{y0}}\right)^2} \quad 0 \leq \psi \leq 1$$

Where
$\sigma_x$, $\sigma_y$—longitudinal and lateral theoretical slip
$\sigma_{x0}$, $\sigma_{y0}$—theoretical slip values where full sliding begins Where the theoretical slip values are calculated as:

$$\sigma_x = \frac{V_{sx}}{V_r}$$

-continued $$\sigma_y = \frac{V_{sy}}{V_r}$$

Where $V_r$—rotational velocity of the tire

The limit theoretical slip where full sliding begins for a given tire are assumed to be known for a given set of conditions based on the tire ID.

$$\sigma_{x0} = \frac{x_0}{1-\kappa_0}$$

$$\sigma_{y0} = \frac{\tan\alpha_0}{1-\kappa_0}$$

Where $\kappa_0$—limit longitudinal slip $\alpha_0$—limit lateral slip angle

Referring to FIGS. 3 through 6, fit results of the Model of FIG. 2 are shown for front left, front right, rear left and rear right tire, respectively. Temperature over time for the test is graphed showing surface temperature of the tires, inner liner temperature, road temperature and fit result. To determine the parameters of the thermal model, the model training data was used. Validation data indicates an acceptable model fit in the test results of FIGS. 3 through 6, validating the conclusion that the model is able to successfully predict the surface temperature of a tire based upon inner liner, ambient temperature combined with frictional energy inputs. Availability of inner liner temperature (bulk temperature) is important for the accuracy of prediction for the model as it is used as the initialization value and also captures the steady state build-up of bulk temperature. Conversely, an inaccurate liner temperature measurement can lead to a drift in the predicted surface temperature of the tire. The model is trained for each axle separately as tires react differently to energy input due to other factors influencing temperature such as engine heat, air flow etc.

Information from standard vehicle sensors are utilized to calculate the frictional energy input to the tire. The can also be supplemented to achieve better accuracy through closed loop observers. Implementation of the Model of FIG. 2 is car specific and tire specific. The training of the Model is conducted on a specific car and specific tire combination with the results of the training generating model parameters for future use. For example, referring to the test reflected in the fit result graphs of FIGS. 3 through 6, one would conduct a model training exercise on a vehicle with specific tires mounted on front and rear axles. The results of the model training generates the parameters of the thermal model in FIG. 2 and are stored for future reference purposes for that particular tire and vehicle combination. The TPMS module mounted to the tire includes a tire identification accessible during vehicle operation. Likewise, the vehicle on which the tires are mounted will be identified by accessible vehicle identification data. Once both the tire and vehicle are identified, the training data for that combination of tire to vehicle is consulted in order to ascertain the parameters that are applicable in the model of FIG. 2. Determination of the specific vehicle, the specific tires used on the vehicle, and the specific tire location on the vehicle are important identification factors to the identification of the model parameters applicable. Empirical training of the model establishes applicable parameters to be used in the model for a particular tire identification, vehicle and tire location combination. Once the parameters are empirically determined and electronically stored, a field identification of tire, vehicle and tire location will allow the model parameters to be identified for tire surface temperature estimation.

The model set forth in FIG. 2 accordingly represents a semi-empirical tool that uses pre-determined training of the model in order to generate applicable model parameters by vehicle, tire, and tire location. The measured steady state inner liner 16 and ambient temperature 18 data $T_l$, $T_a$ are then applied in the prediction algorithm with the frictional energy input $E_x$, $E_y$, $V_x$ in order to generate the surface temperature estimation 28. The tire temperature estimation 28 may then be used in real time by the vehicle stability control systems. The first-order differential equation of FIG. 2 requires a measurement of surface temperature, inner liner temperature, and ambient air temperature. Such measurements may be effected through the utilization of on-board commercially available sensors and sensor data from a tire-based, inner liner mounted, TPMS sensor module. $E_x$ and $E_y$ represent frictional energy in the X and Y directions, algorithmically derived as previously explained.

The contact area $A_c$ for the tire is a required input into the model and used in the surface conduction calculation. Contact area may be measured directly by sensor attachment to the tire indirectly estimated. For example, a co-pending U.S. application Ser. No. 13/534,043, was filed Jun. 27, 2012 and entitled LOAD ESTIMATION SYSTEM AND METHOD FOR A VEHICLE TIRE, and is hereby incorporated herein by reference in its entirety. The co-pending application teaches a method and system for contact length measurement of a rolling tire footprint. Such a measurement of contact footprint length may be used to determine the length of the contact area and, assuming contact width as the tread width, $A_c$ as required in the prediction algorithm of FIG. 2. Other known sensor techniques may be used to directly measure and compute contact area of a rolling tire footprint for use within the subject model if desired.

Figure 7:
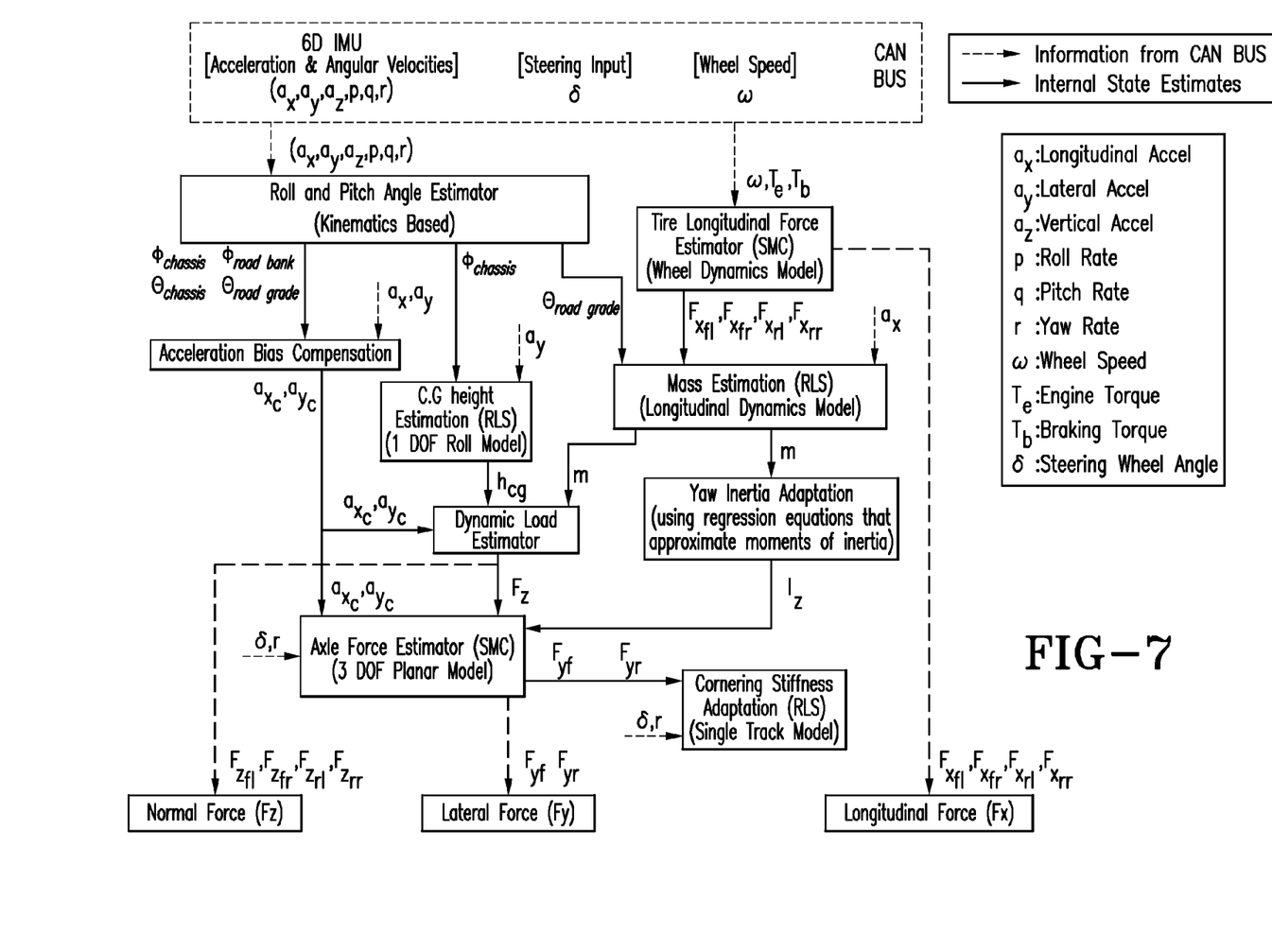
FIG. 7 is a graph showing the tire force estimation observer.
Figure 8:
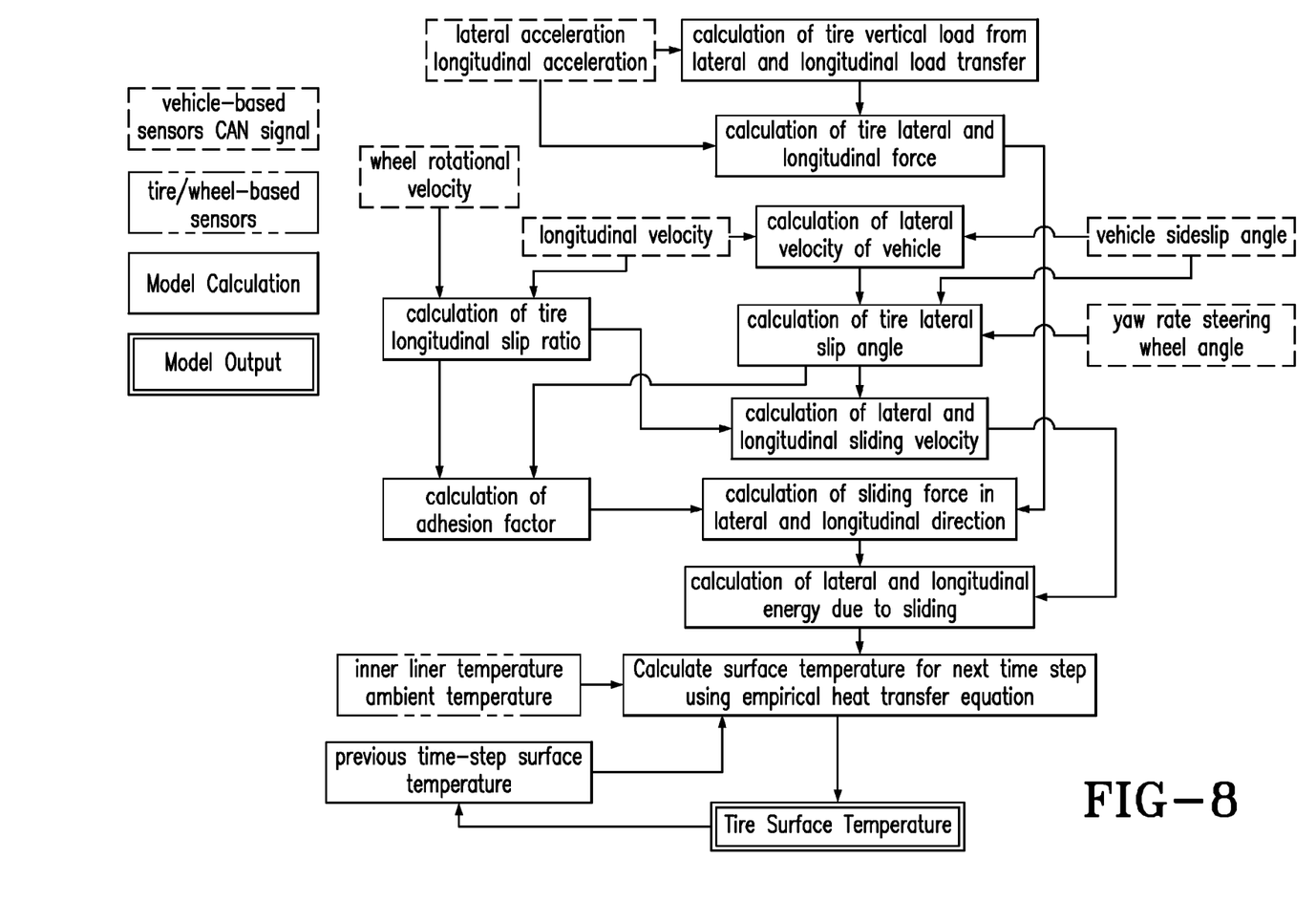
FIG. 8 is a graph showing the tire surface estimation process in its entirety.

Referring to FIGS. 7 and 8, FIG. 7 is a graph showing the tire force estimation observer. Broken line indicates information from the CAN Bus of the vehicle while solid flow lines indicate internal state estimates. It will be noted that the acceleration and angular velocities are information attained from the CAN Bus and input into a kinematics based roll and pitch angle estimator. Roll and pitch angles are applied to an acceleration bias compensation and used to estimate center of gravity height C.G. C.G. height estimation is made by RLS techniques and the estimated height $h_{cg}$, and acceleration variables are applied to a Dynamic Load Estimator for determining dynamic load $F_z$. $F_z$, acceleration variables, and yaw inertia adaptation Iz are further input into the axle force estimator configured as a 3 degrees of freedom SMC model. Wheel speed as shown is CAN Bus information used to determine tire longitudinal force estimation, an estimation of mass by RLS modeling, and yaw inertia adaptation $I_z$. The normal force, lateral force, and longitudinal force variables are thus derived.

FIG. 8 is a block diagram showing the tire surface estimation process in its entirety as described above.

In view of the above, it will be appreciated that a tire-based system and method for estimating a radially outward tire surface temperature of an identified tire supporting an identified vehicle is achieved. The system includes one or more temperature sensors mounted to the tire operative to measure the tire inner liner temperature. The algorithmic prediction model shown in FIG. 2 is empirically trained to correlate the inner liner tire temperature 16 to the tire radially outward surface temperature for the combination represented by the identified tire and the identified vehicle. Such a training establishes the coefficients to be used in the prediction algorithm 10 for the identified tire/vehicle combination. The empirically trained algorithmic prediction model operatively receives a plurality of steady-state temperature-based model inputs 12 including the tire inner liner temperature 16 and a plurality of transient behavior vehicle-based inputs 14 and generates, based upon the steady-state inputs and the transient behavior inputs, a radially outward tire surface temperature estimation 28.

The algorithmic model is trained to correlate inner liner tire temperature to tire radially outward surface temperature for the tire/vehicle combination represented by the identified tire and the identified vehicle and further by a specifically identified tire location on the vehicle.

It will further be appreciated that the system and method employs vehicle-based sensors providing a plurality of vehicle-based transient behavior measurements (vehicle data 20). Using the vehicle data 20, frictional energy is calculated and employed as transient behavior vehicle-based inputs to the algorithmic prediction model. The vehicle-based transient behavior measurements include vehicle acceleration, slip angle and yaw rate measured values.

The system further uses an ambient temperature measurement as one of the steady state behavior inputs into the prediction model algorithm 10. The prediction algorithm includes components including frictional energy loss from travel of the tire over a surface, thermal surface-conduction loss from the tire to the surface; air-convection thermal loss from the tire to the air surrounding the tire; and internal-conduction thermal loss within the tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire-based system for real-time estimation of a temperature of a radially outward tire surface of an identified tire supporting an identified vehicle, the system comprising:
    at least one tire inner liner temperature sensor mounted to the tire operative to measure a tire inner liner temperature, the inner liner temperature being a first steady state input;
    at least one ambient air temperature sensor disposed on the vehicle operative to measure an ambient air temperature, the ambient air temperature being a second steady state input;
    at least one vehicle-based sensor providing vehicle-based transient behavior measurements, the transient behavior measurements being used in the generation of transient behavior vehicle-based inputs;
    an algorithmic prediction model correlating inner liner tire temperature to the temperature of the tire radially outward surface for the combination represented by the identified tire and the identified vehicle, the algorithmic prediction model operatively receiving the steady-state inputs and the transient behavior vehicle-based inputs and generating based upon the steady-state inputs and the transient behavior inputs a real-time estimation of the temperature of the radially outward surface of the vehicle tire during vehicle operation; and
    at least one vehicle control system that operatively receives the real-time estimation of the temperature of the radially outward surface of the vehicle tire.

2. The system of claim 1, wherein the algorithmic model is empirically trained to correlate inner liner tire temperature to tire radially outward surface temperature for the combination represented by the identified tire and the identified vehicle by a specifically identified tire location on the vehicle.

3. The system of claim 1, wherein the system further comprises frictional energy calculating means for generating the transient behavior vehicle-based inputs to the algorithmic prediction model from the vehicle-based transient behavior measurements.

4. The system of claim 3, wherein the vehicle-based transient behavior measurements comprise at least vehicle acceleration, slip angle and yaw rate.

5. The system of claim 1, wherein the algorithmic prediction model combines frictional energy loss from travel of the tire over a surface, thermal surface conduction loss from the tire to the surface; air convection thermal loss from the tire to the air surrounding the tire and internal conduction thermal loss within the tire.

6. A tire-based method for real-time estimation of a temperature of a radially outward tire surface of an identified tire supporting an identified vehicle, the method comprising:
    identifying the tire supporting the vehicle;
    identifying the vehicle;
    mounting at least one temperature sensor to the tire operative to measure a tire inner liner temperature as a first steady state input;
    measuring as a second steady state input an ambient air temperature with at least one ambient air temperature sensor disposed on the vehicle;
    providing vehicle-based transient behavior measurements with at least one vehicle-based sensor, the vehicle-based transient behavior measurements being used to generate transient behavior vehicle-based inputs;
    empirically training an algorithmic prediction model to correlate inner liner tire temperature to tire radially outward surface temperature for the combination represented by the identified tire and the identified vehicle;
    inputting into the empirically trained algorithmic prediction model the steady-state inputs and the transient behavior vehicle-based inputs;
    generating based upon the steady-state inputs and the transient behavior inputs a real-time estimation of the temperature of the radially outward surface of the vehicle tire during vehicle operation; and
    using the real-time estimation of the temperature of the radially outward surface of the vehicle tire in at least one vehicle control system.

7. The method of claim 6, wherein the method further comprises empirically training the algorithmic model to correlate inner liner tire temperature to tire radially outward surface temperature for the combination represented by the identified tire and the identified vehicle by a specifically identified tire location on the vehicle.

8. The method of claim 6, wherein the method further comprises
    calculating frictional energy as transient behavior vehicle-based inputs to the algorithmic prediction model from the vehicle-based transient behavior measurements.

9. The method of claim 8, wherein the vehicle-based transient behavior measurements comprise at least vehicle acceleration, slip angle, and yaw rate.

10. The method of claim 6, wherein the method further comprises combining within the algorithmic prediction model frictional energy loss from travel of the tire over a surface, thermal surface-conduction loss from the tire to the surface; air-convection thermal loss from the tire to the air surrounding the tire; and internal-conduction thermal loss within the tire.

* * * * *